(12) United States Patent
Kish et al.

(10) Patent No.: US 9,790,038 B2
(45) Date of Patent: Oct. 17, 2017

(54) BUMPERS FOR USE AT LOADING DOCKS

(71) Applicants: John A. Kish, Grafton, WI (US);
Joseph Manone, Milwaukee, WI (US)

(72) Inventors: John A. Kish, Grafton, WI (US);
Joseph Manone, Milwaukee, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 87 days.

(21) Appl. No.: 15/013,579

(22) Filed: Feb. 2, 2016

(65) Prior Publication Data
US 2017/0217697 A1   Aug. 3, 2017

(51) Int. Cl.
*B65G 69/00*   (2006.01)
*B65G 69/28*   (2006.01)

(52) U.S. Cl.
CPC ........ *B65G 69/001* (2013.01); *B65G 69/2811* (2013.01)

(58) Field of Classification Search
CPC .................... B65G 69/001; B65G 69/2811
USPC ............................................... 14/69.5
See application file for complete search history.

(56) References Cited

U.S. PATENT DOCUMENTS

| 2,489,869 A | 11/1949 | Dunn |
| 2,649,295 A | 8/1953 | Schuyler |
| 3,203,002 A | 8/1965 | McGuire |
| 3,268,199 A | 8/1966 | Kordyban et al. |
| 3,411,168 A | 11/1968 | Hecker, Jr. |
| 3,440,673 A | 4/1969 | Kelley |
| 3,786,530 A | 1/1974 | Le Clear |
| 3,840,930 A | 10/1974 | Wanddell |
| 3,841,683 A | 10/1974 | Toro |
| 3,933,111 A | 1/1976 | von Bose et al. |
| 4,420,849 A | 12/1983 | Alten |
| 5,450,643 A | 9/1995 | Warner |
| 5,658,633 A | 8/1997 | Di Biase |
| 5,881,414 A | 3/1999 | Alexander |
| 6,070,283 A | 6/2000 | Hahn |
| 6,120,871 A | 9/2000 | De Biase |
| 6,497,076 B1 | 12/2002 | van de Wiel et al. |
| 7,584,943 B2 | 9/2009 | DiBiase |

(Continued)

FOREIGN PATENT DOCUMENTS

| DE | 29804117 | 6/1998 |
| DE | 10003744 | 10/2001 |

(Continued)

OTHER PUBLICATIONS

International Searching Authority, "International Search Report," issued in connection with PCT Patent Application No. PCT/US2017/014367, dated Apr. 19, 2017, 7 pages.

(Continued)

*Primary Examiner* — Raymond W Addie
(74) *Attorney, Agent, or Firm* — Hanley, Flight & Zimmerman, LLC

(57) ABSTRACT

Bumpers for use at loading docks include a housing defining a lip-engaging surface to engage a lip of a deck when the lip is in a retracted position, and a RIG-engaging surface positioned adjacent the lip-engaging surface. The RIG-engaging surface is movable relative to the lip-engaging surface. The RIG-engaging surface is to move relative to the lip-engaging surface when a RIG of a vehicle imparts a force to the RIG-engaging surface when the vehicle is at a loading dock.

24 Claims, 6 Drawing Sheets

(56) References Cited

U.S. PATENT DOCUMENTS

| | | |
|---|---|---|
| 8,181,759 B2 | 5/2012 | Schmidt et al. |
| 2002/0157195 A1 | 10/2002 | Alexander |
| 2006/0049558 A1 | 3/2006 | Cowey |
| 2007/0151819 A1 | 7/2007 | Schmidt et al. |
| 2014/0131144 A1 | 5/2014 | Bynoe et al. |

FOREIGN PATENT DOCUMENTS

| | | |
|---|---|---|
| EP | 0025266 | 3/1981 |
| EP | 0040388 | 11/1981 |
| EP | 2927532 | 10/2015 |
| FR | 2686913 | 8/1993 |
| FR | 2841883 | 1/2004 |
| WO | 0026471 | 5/2000 |
| WO | 02070382 | 9/2002 |
| WO | 2013036606 | 3/2013 |

OTHER PUBLICATIONS

International Searching Authority, "Written Opinion," issued in connection with PCT Patent Application No. PCT/US2017/014367, dated Apr. 19, 2017, 14 pages.

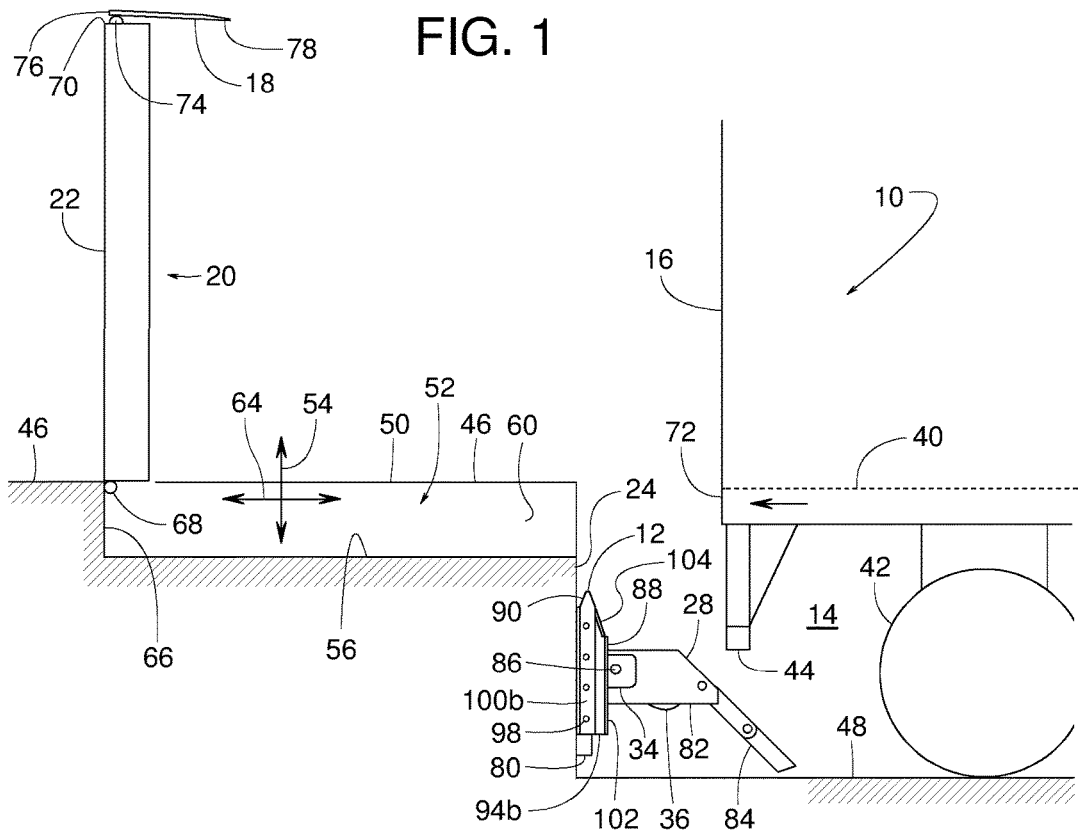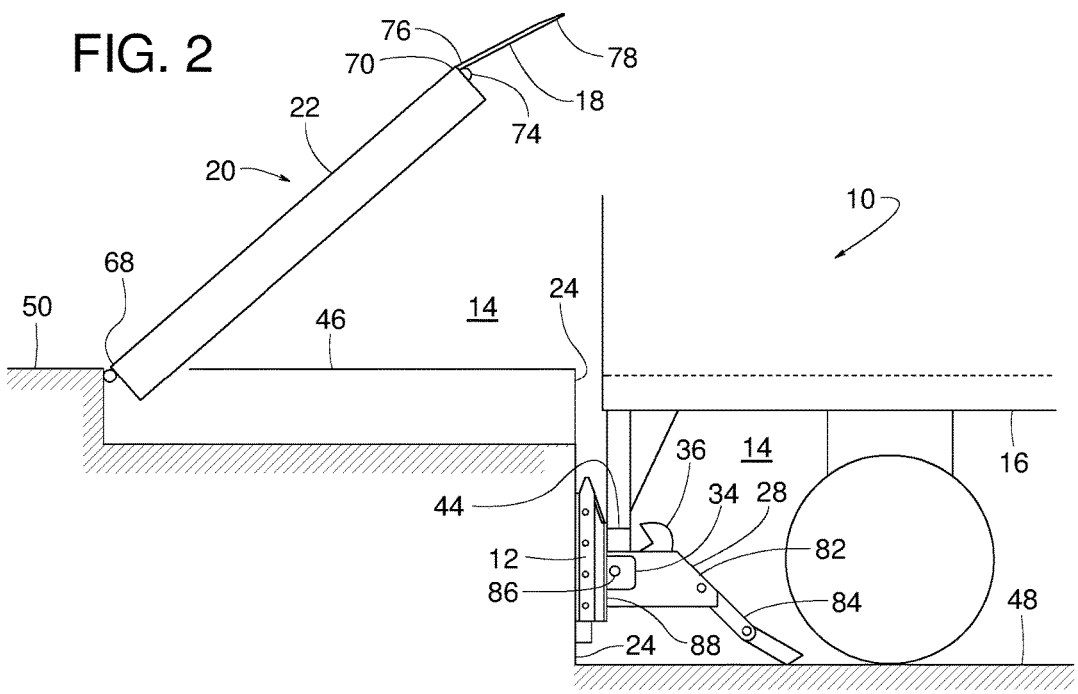

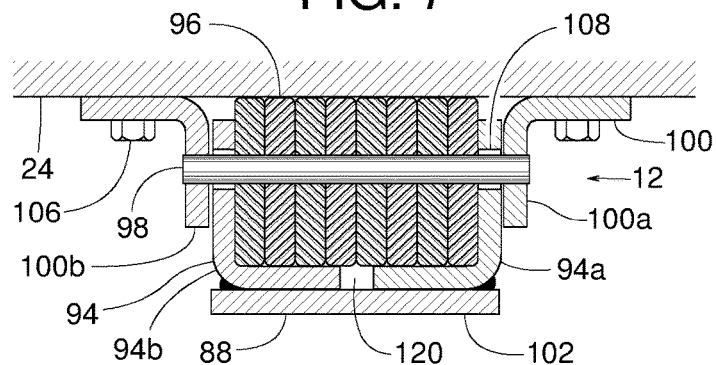
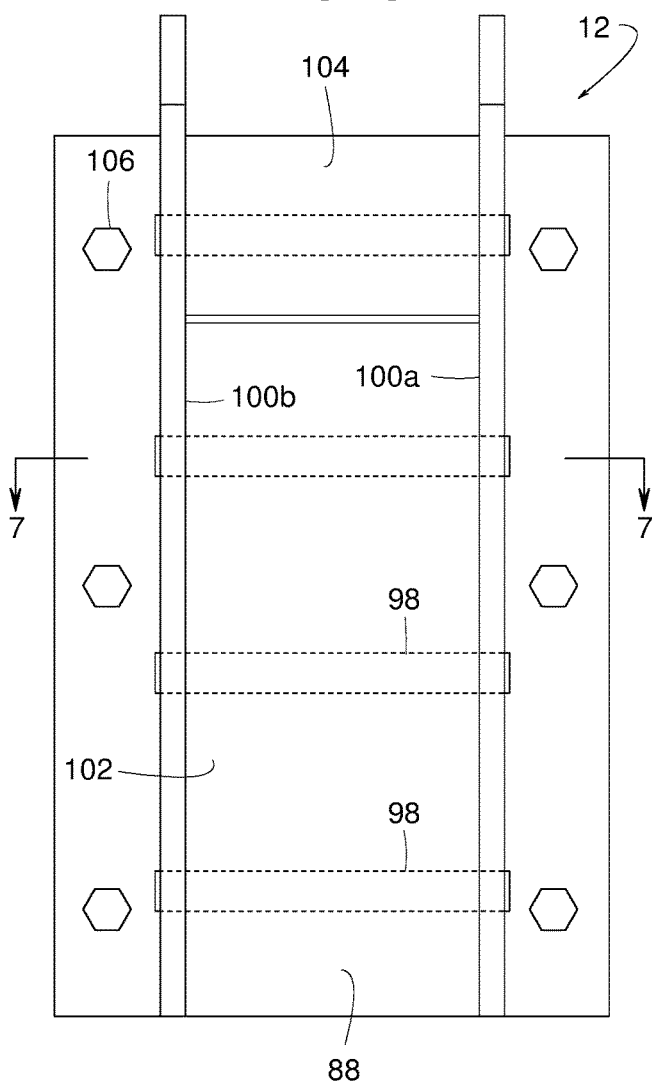
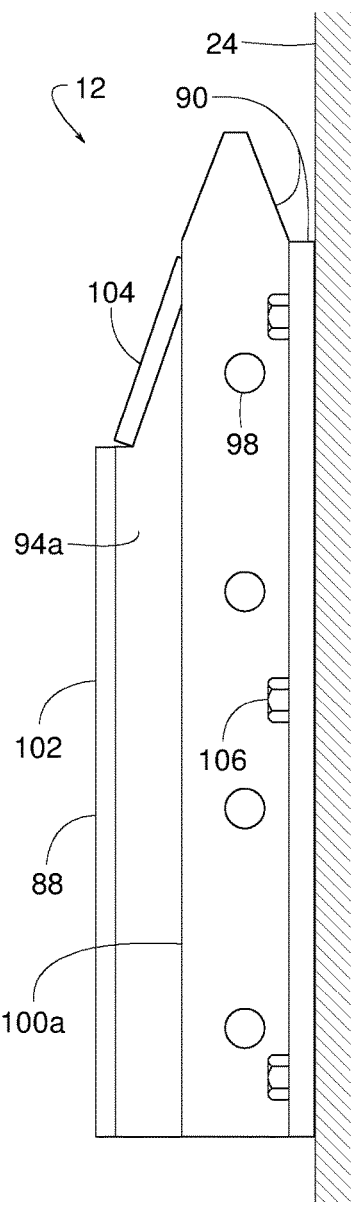

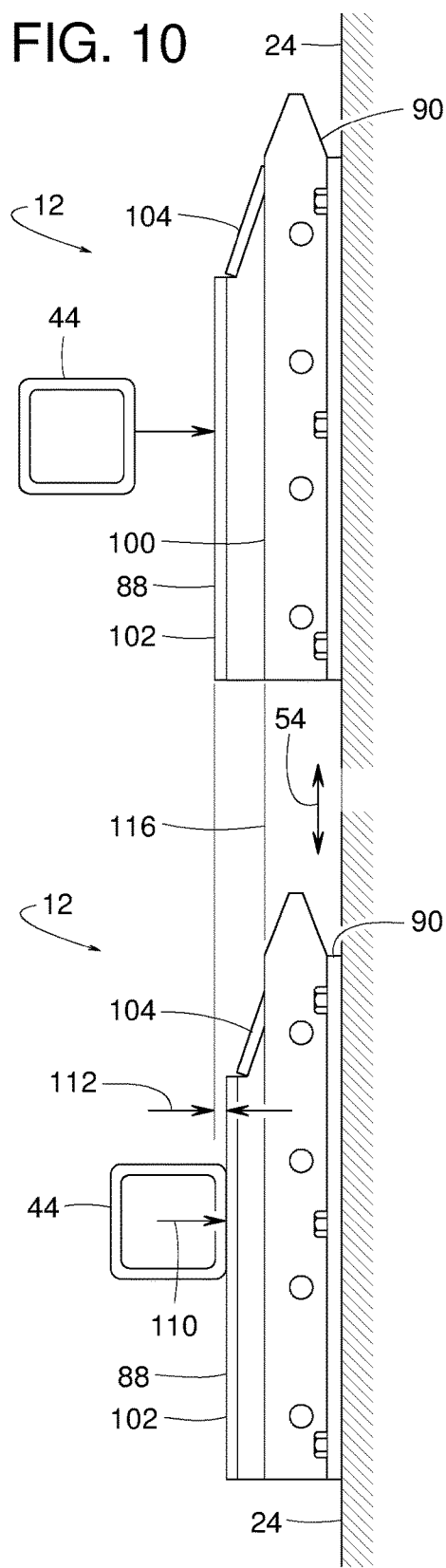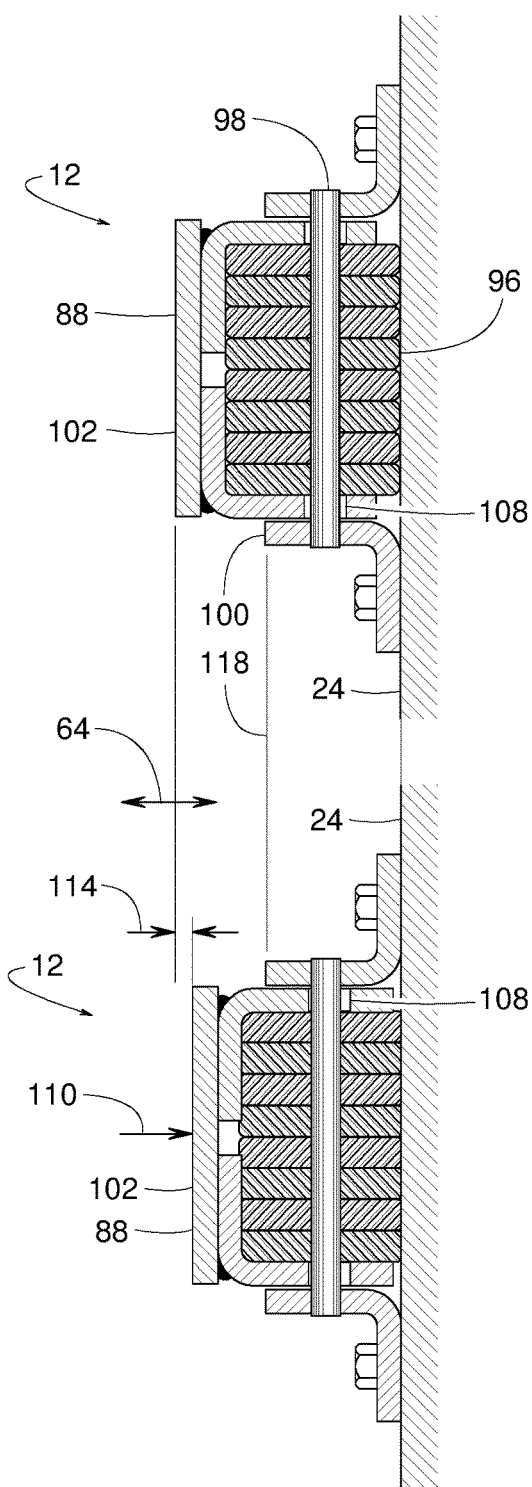

US 9,790,038 B2

BUMPERS FOR USE AT LOADING DOCKS

FIELD OF THE DISCLOSURE

This patent generally pertains to vehicle bumpers and, more specifically, to bumpers for use at loading docks.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along a back edge to vary the height of a front edge. A retractable extension plate or lip pivots or translates outward from the deck's front edge to span the gap between the rear of the truck bed and the front edge of the deck. The deck and lip provide a bridge between the dock's platform and the vehicle's bed so that personnel and material handling equipment can readily move on and/or off the vehicle during loading and/or unloading operations.

To help prevent the vehicle from accidentally or prematurely departing from the dock, some loading docks have a vehicle restraint with a hook-like barrier that can be selectively moved between a raised blocking position and a lowered release position. In the blocking position, the barrier engages a front edge of a vehicle's RIG (rear impact guard) to help restrain the vehicle at the dock. The vehicle restraint releases the vehicle by lowering the barrier to a release position below the RIG. A RIG or rear impact guard (also known as an ICC bar) is a horizontal bar at the rear of the vehicle and is situated several inches below the vehicle's truck/trailer bed. The primary purpose of a RIG is to help prevent an automobile from underriding a truck or trailer in the event of a rear end collision.

Many dock leveler installations have a pit in which the deck can descend to a cross-traffic position where the upper surface of the deck is generally flush with the platform. While some decks are stored at the cross-traffic position, other dock levelers known as "vertically storing" dock levelers have a pivotal deck that is generally upright when stored. Vertically storing dock levelers are sometimes used in so-called "drive-through" applications. Drive-through applications are loading dock arrangements where the rear cargo doors of a vehicle can be swung open about the vehicle's rear vertical door hinges after the vehicle has already been backed into the dock and properly positioned for loading and unloading operations.

BRIEF DESCRIPTION OF THE DRAWINGS

FIG. 1 is a side view of an example loading dock apparatus constructed in accordance with the teachings disclosed herein.

FIG. 2 is a side view similar to FIG. 1 but showing the loading dock apparatus in another operating configuration.

FIG. 7 is a cross-sectional view taken along line 7-7 of FIG. 8.

FIG. 8 is a front view of an example RIG bumper constructed in accordance with the teachings disclosed herein.

FIG. 9 is a right side view of FIG. 8.

FIG. 10 is a right side view diagram illustrating a resilient compressibility of the example RIG bumper shown in FIGS. 1-9.

FIG. 11 is a top cross-sectional diagram similar to FIG. 7 but illustrating the resilient compressibility of the example RIG bumper shown in FIGS. 1-10.

DETAILED DESCRIPTION

Figure 3:
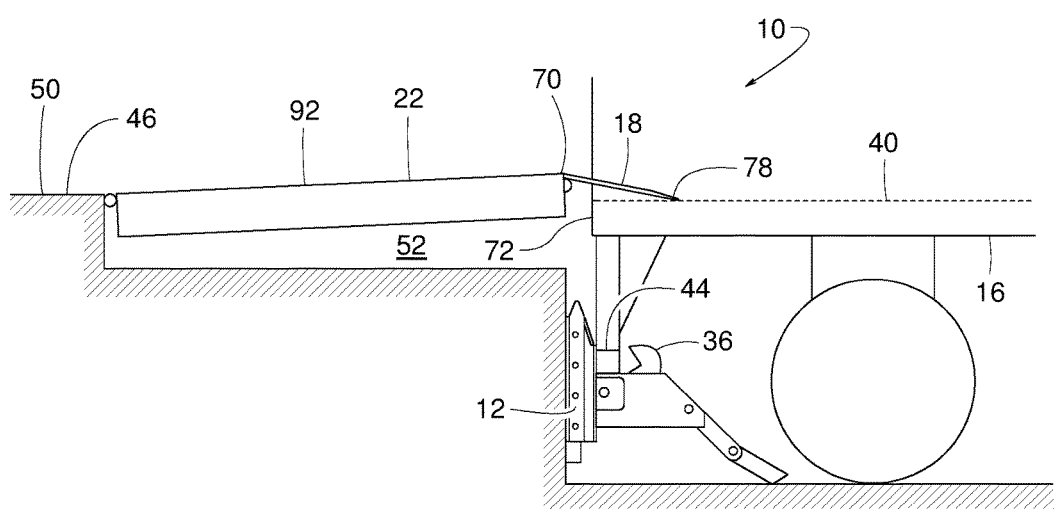
FIG. 3 is a side view similar to FIGS. 1 and 2 but showing the loading dock apparatus in another operating configuration.

Example loading dock apparatus disclosed herein include a RIG bumper that at least (1) absorbs a shock or impact of a truck or trailer backing into the dock, and (2) supports a lip plate of a dock leveler to help hold a pivotal deck of the dock leveler at a (e.g., horizontal) cross-traffic position. In some examples, two RIG bumpers are installed at strategic locations on a dock face of a dock, for example, below the deck and below the lip plate. In some examples, each RIG bumper has a resiliently or movable RIG-engaging front face and a substantially stationary or fixed upward facing lip-engaging surface. In some examples, the dual-purpose RIG bumpers and their mounting locations provide room for running a wiring harness between a vehicle restraint on the dock face and the vehicle restraint's associated electrical box.

FIGS. 1-11 show an example loading dock apparatus 10 including a RIG bumper 12 constructed in accordance with the teachings of this disclosure for use at a loading dock 14 where a vehicle 16 (e.g., truck, trailer, etc.) can be loaded and/or unloaded of its cargo. In the illustrated example, the RIG bumper 12 provides at least two main functions, (1) absorbing the shock or impact of vehicle 16 backing into dock 14, and (2) supporting a lip 18 of a dock leveler 20 to help hold a pivotal deck 22 of the leveler 20 at a (e.g., horizontal) cross-traffic position, as shown for example in FIG. 4. Employing the RIG bumper 12 for both tasks eliminates the need for separate structures for each function. Having fewer discrete structures on a dock face 24 of the dock 14, as shown for example in FIG. 5, reduces installation costs and provides room or space to run or route an electrical cable 26 between a vehicle restraint and an associated electrical box 30 of the vehicle restraint 30.

The electrical box 30 normally houses various electronic components. Examples of such components include, but are not limited to, one or more indicator lights 32 (e.g., red, green, go, stop, restrained, released, etc.), an illuminated text display, an audible alarm, one or more control switches, etc. The electrical cable 26 conveys various electrical signals and/or electrical power to energize a drive unit 34 (e.g., an electric motor) for moving a barrier 36 of the vehicle restraint 28. Examples of electrical signals include, but are not limited to, various feedback signals from one or more sensors 38 on the vehicle restraint 28, where such sensors detect a position of moving components of the vehicle restraint 28, detect an operational status of the vehicle restraint 28, and/or detect a position of the vehicle 16.

In the illustrated example, the vehicle 16 includes a truck/trailer bed 40 for carrying cargo, a plurality of wheels 42 for transport, and a RIG 44 (Rear Impact Guard). The RIG 44, also known as an ICC bar (Interstate Commerce Commission bar), is a horizontal bar at a rear of the vehicle 16 and is situated several inches below the truck/trailer bed 40. The RIG 44 helps prevent an automobile from underriding the vehicle 16 in the event of a rear end collision. In some examples, the vehicle restraint 28 selectively extends the barrier 36 (e.g., a hook) in front of the RIG 44 to help prevent the vehicle 16 from accidentally or prematurely departing dock 14.

In the illustrated example, the loading dock 14 includes a platform 46, the dock face 24, and a driveway 48. The term, "driveway" refers to any suitable surface over which the vehicle 16 can travel, and the surface can be of any width, length and material. To ease the loading and/or unloading of cargo, the platform 46 defines an upper surface 50 that is elevated above or relative to the driveway 48 such that the upper surface 50 is adjacent and/or near the same height at the truck/trailer bed 40. The platform 46 also defines a pit 52 in which the deck 22 is installed. The pit 52 extends in a vertical direction 54 between a pit floor 56 and the upper surface 50. The pit 52 extends in a lateral direction 58 (FIG. 5) between a right sidewall 60 and a left sidewall 62 of the pit 52. The pit 52 extends in a longitudinal direction 64 between the dock face 24 and a back wall 66 of the pit 52. The lateral direction 58 is horizontal and perpendicular to the vertical direction 54, and the longitudinal direction 64 is horizontal and perpendicular to both the vertical direction 54 and the lateral direction 58.

In some examples, to compensate for a height differential between the upper surface 50 of the platform 46 and the truck/trailer bed 40, a rear edge 68 of the deck 22 is hinged near the back wall 66 of the pit 52 to allow the deck 22 to pivot and, thus, adjust the elevation of a front edge 70 of the deck 22 to more closely match an elevation of the truck/trailer bed 40. To bridge a horizontal gap between the front edge 70 of the deck 22 and a rear edge 72 (FIG. 3) of the truck/trailer bed 40, the lip 18 extends forward from the deck's front edge 70 to reach out and rest upon the truck/trailer bed 40, as shown for example in FIG. 3. Thus, the deck 22 and the lip 18 provide a bridge over which material handling equipment travel while transferring cargo between the platform 46 and the vehicle 16.

Figure 5:
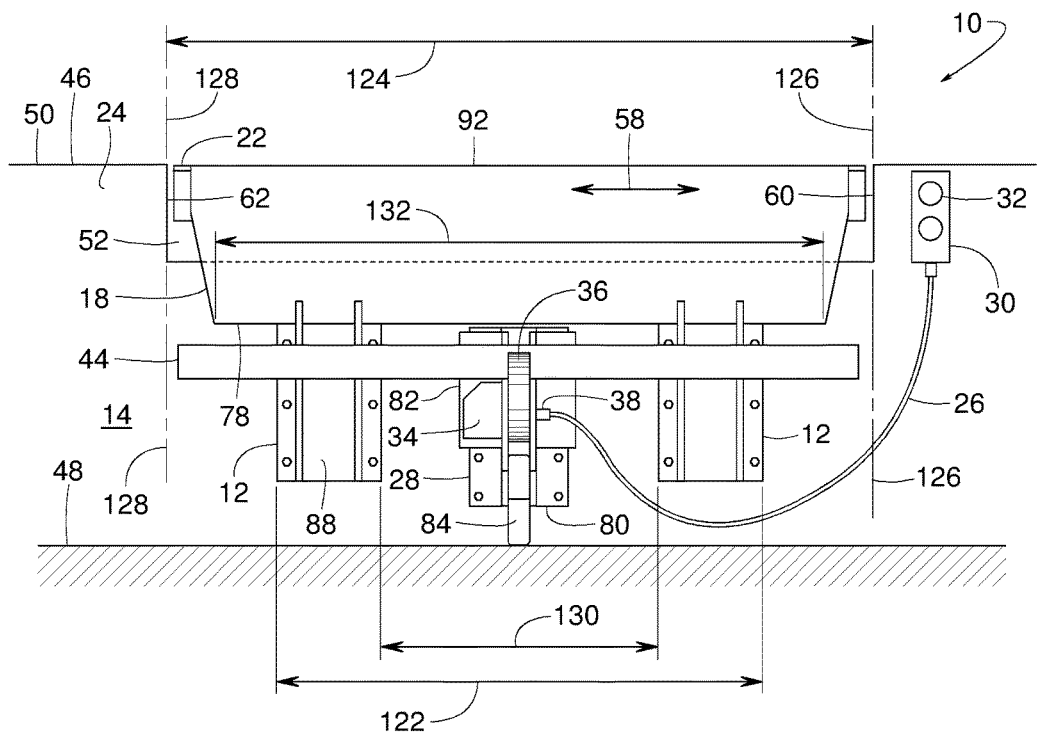
FIG. 5 is a front view of FIG. 4.
Figure 6:
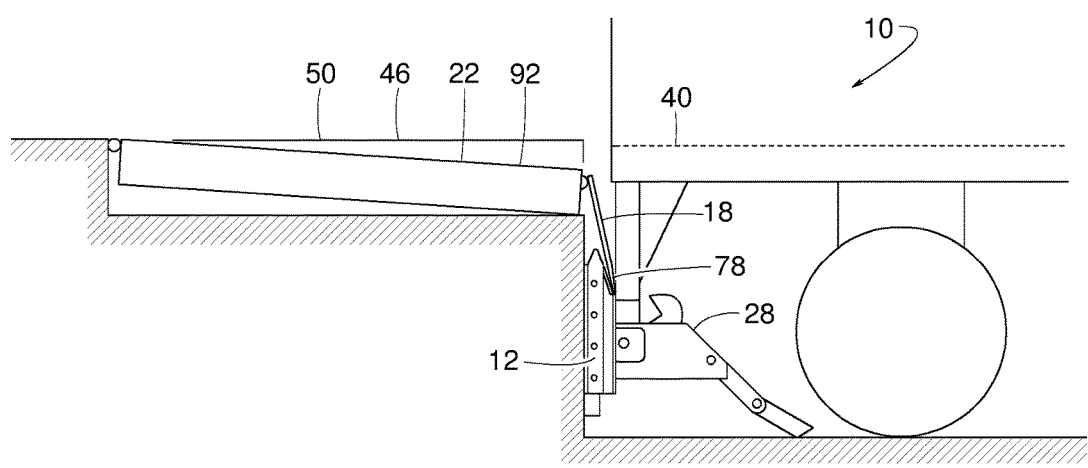
FIG. 6 is a side view similar to FIGS. 1-4 but showing the loading dock apparatus in another operating configuration.

In the illustrated example, a hinge 74 connects an attached edge 76 or other portion of the lip 18 to the deck 22 so that the lip 18 can pivot for certain loading and/or unloading operations that will be explained later. In some examples, the lip 18 can pivot relative to the deck 22 between a retracted position (e.g., FIGS. 1, 4 and 5) and an extended position (e.g., FIGS. 2 and 3). In some examples, the deck 22 can pivot relative to the platform 46 between a raised position (e.g., FIG. 1) and a lowered position (e.g., FIGS. 3, 4 and 5). FIG. 6 shows the deck 22 at a lowermost position with the lip 18 at an intermediate retracted position. The movement of the deck 22 and the lip 18 can be driven by any suitable devices or means, examples of which include, but are not limited to, hydraulic cylinder, pneumatic cylinder, bellows, bladder, tension spring, compression spring, pneumatic spring, electric motor, linkages, manual force, gravity, and/or various combinations thereof, and/or another device(s).

FIGS. 1, 2 and 3 sequentially illustrate an example operation. FIG. 1 shows the vehicle 16 backing into the dock 14 while the deck 22 is stored in a raised position, a distal edge 78 of the lip 18 is in the retracted position, and the vehicle restraint 28 is in a preparatory configuration. In this example, the vehicle restraint 28 includes a track 80 mounted to the dock face 24, a carriage 82 vertically movable along the track 80, an articulated lead-in ramp 84 pivotally connected to a front end of carriage 82, the barrier 36 pivotally coupled to the carriage 82, and the drive unit 34 for rotating the barrier 36 about a shaft 86 between a release position (FIG. 1) and a blocking position (FIGS. 2 and 3). In this example, the vehicle restraint 28 includes a spring that biases the carriage 82 upward. Other examples of the loading dock apparatus 10 include other types of vehicle restraints with other methods, devices or means for actuation, where such other types of vehicle restraints are known to those of ordinary skill in the art.

FIG. 2 shows the vehicle 16 having backed into the dock 14 until RIG 44 is backed up against a RIG-engaging surface 88 of the RIG bumper 12, which stops further rearward movement of the vehicle 16. Prior to reaching the RIG-engaging surface 88, the RIG 44 slides over lead-in ramp 84 and thereby forces carriage 82 down from the position of FIG. 1 to the position of FIG. 2. After the RIG 44 is in the position shown in FIG. 2, the drive unit 34 rotates the barrier 36 to the blocking position in front of the RIG 44 to help restrain the vehicle 16 at a proper loading/unloading position. Once the vehicle 16 is safely restrained and any rear cargo doors of the vehicle 16 are opened, the lip 18 pivots from the retracted position to the extended position, and the deck 22 descends from the raised position to the lowered position to place the lip's distal edge 78 down against the truck/trailer bed 40, as shown for example in FIG. 3. In this configuration, cargo can be readily transferred between vehicle 16 and platform 46.

Figure 4:
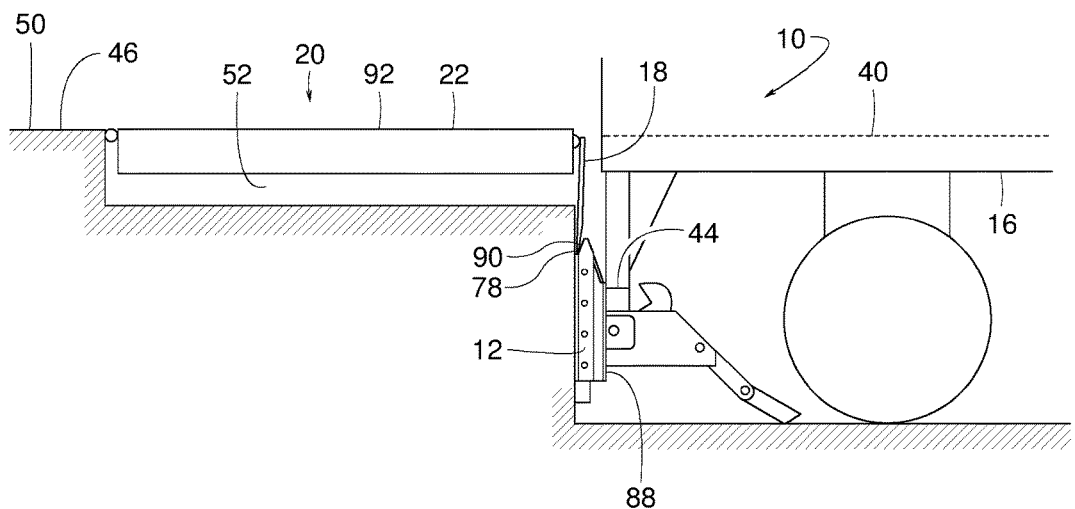
FIG. 4 is a side view similar to FIGS. 1-3 but showing the loading dock apparatus in yet another operating configuration.

As alluded to earlier, the dock leveler 20 and the RIG bumper 12 can be reconfigured for end loading and unloading operations, where cargo is added or removed from the very back end of the bed 40 in an area where the lip's distal edge 78 normally rests. In an end loading configuration, as shown in FIGS. 4 and 5, the lip 18 is in the retracted position with the lip's distal edge 78 engaging a lip-engaging surface 90 of the RIG bumper 12. This allows the RIG bumper 12 to help support the weight of the deck 22 at the deck's cross-traffic position, where the cross-traffic position is another example of a lowered position of the deck 22. In the cross-traffic position, an upper surface 92 of the deck 22 is approximately flush with the platform's upper surface 50.

In another configuration, shown in FIG. 6, the deck 22 is set at a lowermost position, which enables end loading in situations where the truck/trailer bed 40 is particularly low (i.e., lower than the platform's upper surface 50). To achieve this end loading, the lip's distal edge 78 is placed in front of an upper portion of the RIG bumper 12, which allows the deck 22 to descend from the lower position of FIG. 4 to the lowermost position of FIG. 6 without the RIG bumper's lip-engaging surface 90 preventing the deck 22 from descending to the lowermost position.

Although the actual structure of the RIG bumper 12 may vary, the example RIG bumper 12 illustrated in FIGS. 7-9 includes a metal casing member 94 (e.g., a pair of metal casing members having a right casing member 94*a* and a left casing member 94*b*), a polymeric member 96 and/or a similar (e.g., an equivalent) resiliently compressible member sandwiched or positioned within the metal casing member 94, a plurality of tie rods 98 (e.g., a shaft, a screw, etc.), a metal mounting member 100 (e.g., a pair of metal mounting members including a right mounting member 100*a* and a left mounting member 100*b*), a front metal plate 102 in front of the casing member 94, and a metal inclined plate 104 against which the lip's distal edge 78 rests when the loading dock configuration is as shown in FIG. 6.

In some examples, the polymeric member 96 is a combination of rubber and other materials. In some examples, the polymeric member 96 includes multiple layers of recycled automotive/truck tire pieces. In the illustrated example, the polymeric member 96 is sandwiched or positioned between two casing members 94a and 94b. In the illustrated example, the casing members 94a and 94b are in the shape of metal angles. In some examples, the front plate 102 and the inclined plate 104 are welded to the casing members 94a and 94b. The casing member 94, the front plate 102, the inclined plate 104 and the polymeric member 96 provide the resiliently movable portion of the RIG bumper 12.

The mounting member 100 and the tie rods 98 are the generally stationary or fixed portions of the RIG bumper 12. In some examples, the mounting member 100 includes a right mounting member 100a and a left mounting member 100b, and anchor bolts 106 to rigidly fasten mounting members 100a and 100b to the dock face 24. In the illustrated example, the tie rods 98 extend through the polymeric member 96 and holes 108 in the casing member 94. Opposite ends of each tie rod 98 are welded to the mounting member 100.

A radial clearance is provided between the holes 108 and their respective tie rod 98 to permit relative movement (in the longitudinal direction 64) between the casing member 94 and the mounting member 100. Thus, in reaction to the RIG 44 exerting an impact force 110 (FIGS. 10 and 11) against the RIG bumper 12 and by virtue of the polymeric member 96 being resiliently compressible, the RIG-engaging surface 88 can move with shock absorbing resilience relative to the dock face 24. Such movement is identified by arrow 112 of FIG. 10 and arrow 114 of FIG. 11. A reference line 116 of FIG. 10 and a reference line 118 of FIG. 11 represent or indicate that the mounting member 100 and the upward facing lip-engaging surface 90 remain substantially stationary as the other parts (e.g., the movable portion) of the RIG bumper 12 move in response to the impact force 110. The lip engaging surface 90 remaining stationary ensures that the RIG bumper 12 can support the deck 22 at the cross-traffic elevation or position.

In some examples, the RIG-engaging surface 88 has a first range of resilient movement with reference to the longitudinal direction 64, the lip-engaging surface 90 has a second range of resilient movement with reference to the vertical direction 54, and the first range of resilient movement is appreciably greater than the second range of resilient movement. In some examples, the first range of resilient movement of the RIG-engaging surface 88 is about a 0.25 inches, and the second range of resilient movement of the lip-engaging surface 90 is due to the limited flexibility of steel and so the second range of resilient movement of the lip-engaging surface 90 is substantially equal to zero (i.e., lip-engaging surface 90 remains substantially stationary).

In some examples, the front plate 102 and the inclined plate 104 are each made of steel to provide a tough wear resistant surface. In some examples, the mounting member 100 is a unitary piece for simplicity. In some examples, the casing member 94 is a unitary piece for simplicity. In some examples, the casing member 94 is a two-piece combination of the casing members 94a and 94b with a lateral clearance 120 therebetween to accommodate an indeterminate stacked thickness of the polymeric member 96. In some examples, the mounting member 100 is a combination of the mounting members 100a and 100b, where lateral spacing between the mounting members 100a and 100b can be adjusted (e.g., prior to welding tie rods 98) to accommodate a possible indeterminate lateral width of a two-piece version of the casing member 94.

The example loading dock apparatus 10, illustrated in FIGS. 1-11, is particularly suited for "vertical storing" dock levelers when used in so-called "drive-through" applications. Vertical storing dock levelers have pivotal decks that are generally upright when stored, as shown in FIG. 1. Drive-through applications are loading dock arrangements where the rear cargo doors of a vehicle can be swung open about the vehicle's rear vertical hinges after the vehicle has already backed into the dock and is properly parked and positioned against a dock-mounted bumper. The deck 22 has a generally vertical stored position to provide clearance for the vehicle's rear cargo door to swing open. Conventional dock bumpers mounted at about the same elevation as the vehicle's truck/trailer bed can obstruct the opening of the cargo doors. Installing the dock bumpers at a lower elevation can crowd out and/or interfere with other components in the area such as conventional lip keepers, a vehicle restraint and an electrical harness of the vehicle restrain. Consequently, some examples of the loading dock apparatus 10 include two substantially identical RIG bumpers 12 (e.g., first and second RIG bumpers) that are installed at strategic locations, as illustrated for example in FIG. 5.

This illustrated example includes several features including, but not limited to, two RIG bumpers 12 being laterally spaced apart to provide balanced loading across the RIG 44, the RIG bumpers 12 being lower than the pit's floor 56 to avoid interfering with the vehicle's cargo doors, the RIG-engaging surface 88 being below the lip 18 while the lip 18 is resting upon the RIG bumper's lip-supporting surface 90, and two RIG bumpers 12 being installed over a lateral distance 122 that is less than a lateral distance 124 between the pit's sidewalls 60 and 62 to ensure the RIG 44 can engage both the RIG bumpers 12. In other words, the right sidewall 60 lies along a first plane 126, the left sidewall 62 lies along a second plane 128, and both the RIG bumpers 12 are mounted at predetermined locations between planes 126 and 128 of the respective right and left side walls 60 and 62. In some examples, the RIG bumpers 12 are separated by a spaced-apart distance 130 that is less than a horizontal length 132 of the lip's distal edge 78. The term, "plane" is a geometric reference and so it is not necessarily an actual physical structure.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A loading dock apparatus for receiving a vehicle backing into a loading dock, the loading dock having a platform that is elevated relative to a driveway leading to the platform, the platform defining a pit extending in a vertical direction between a pit floor and an upper surface of the platform, the pit extending in a lateral direction between a right sidewall and a left sidewall of the pit, the pit extending in a longitudinal direction between a back wall of the pit and a dock face that extends downward from the upper surface of the platform to the driveway, the lateral direction being horizontal and perpendicular to the vertical direction, the longitudinal direction being horizontal and perpendicular to both the vertical direction and the lateral direction, the loading dock further having a deck extending into the pit, the deck being selectively movable to a raised position and a lowered position relative to the platform, the loading dock further having a lip attached to the deck, the lip having a distal edge that is movable selectively to an extended position and a retracted position relative to the deck, the loading dock apparatus comprising:

a first RIG bumper attached to the dock face, the first RIG bumper protruding in the longitudinal direction from the dock face to a RIG-engaging surface of the first RIG bumper, the first RIG bumper having a lip-engaging surface facing upward, the distal edge of the lip to engage the lip-engaging surface of the first RIG bumper when the deck is in the lowered position while the lip is in the retracted position, the distal edge of the lip being spaced apart from the lip-engaging surface when the deck is in the raised position, and the RIG-engaging surface moving relative to the lip-engaging surface in reaction to an impact created by the vehicle backing up against the first RIG bumper.

2. The loading dock apparatus of claim 1, wherein the lip-engaging surface is substantially stationary when the RIG-engaging surface moves relative to the lip-engaging surface during the impact.

3. The loading dock apparatus of claim 1, wherein the first RIG bumper includes a polymeric member interposed between the RIG-engaging surface and the dock face, and the movement of the RIG-engaging surface is by virtue of the polymeric member being resiliently compressible.

4. The loading dock apparatus of claim 1, further comprising:
   a front metal plate that includes the RIG-engaging surface; and
   a polymeric member interposed between the front metal plate and the dock face, wherein the movement of the RIG-engaging surface is by virtue of the polymeric member being resiliently compressible.

5. The loading dock apparatus of claim 1, wherein the RIG-engaging surface extends lower than the pit floor.

6. The loading dock apparatus of claim 1, wherein an entire dimensional profile of the first RIG bumper is positioned lower than the pit floor.

7. The loading dock apparatus of claim 1, wherein the right sidewall of the pit lies along a first plane, the left sidewall of the pit lies along a second plane, and the first RIG bumper is between the first plane and the second plane.

8. The loading dock apparatus of claim 1, wherein the deck is further moveable to a lowermost position that is lower than the lowered position, and the first RIG bumper is between the dock face and the distal edge of the lip when the deck is in the lowermost position.

9. The loading dock apparatus of claim 1, wherein the RIG-engaging surface extends below the distal edge of the lip when the deck is in the lowered position and the lip is in the retracted position engaging the lip-engaging surface of the first RIG bumper.

10. The loading dock apparatus of claim 1 further including:
    a second RIG bumper being substantially similar in structure to the first RIG bumper, the second RIG bumper being attached to the dock face; and
    a vehicle restraint barrier coupled to the dock face, the vehicle restraint barrier being movable selectively between a blocking position and a release position, the blocking position being higher than the release position, the vehicle restraint barrier with reference to the lateral direction being situated between the first RIG bumper and the second RIG bumper.

11. The loading dock apparatus of claim 1 further including a second RIG bumper being substantially similar in structure to the first RIG bumper, the second RIG bumper being attached to the dock face, the second RIG bumper being a spaced-apart distance from the first RIG bumper, the spaced-apart distance being less than a horizontal length of the distal edge of the lip.

12. The loading dock apparatus of claim 1, wherein the first RIG bumper includes:
    a pair of metal casing members;
    a polymeric member positioned between the pair of metal casing members; and
    a pair of metal mounting members attached to the dock face, the polymeric member and the pair of metal casing members being positioned between the pair of metal mounting members, the pair of metal mounting members being substantially stationary relative to the dock face, the pair of metal casing members being movable relative to the pair of metal mounting members by virtue of the polymeric member being resiliently compressible.

13. The loading dock apparatus of claim 12, wherein the first RIG bumper includes a front metal plate that includes the RIG-engaging surface, the polymeric member is interposed between the front metal plate and the dock face, and the first RIG bumper further includes an inclined plate extending above the front metal plate.

14. The loading dock apparatus of claim 13, wherein the deck is further moveable to a lowermost position that is lower than the lowered position, and the lip is to engage the inclined plate when the deck is in the lowermost position while the lip rests against the first RIG bumper.

15. A loading dock apparatus for receiving a vehicle backing into a loading dock, wherein the loading dock having a platform that is elevated relative to a driveway leading to the platform, the platform defining a pit extending in a vertical direction between a pit floor and an upper surface of the platform, the pit extending in a lateral direction between a right sidewall and a left sidewall of the pit, the pit extending in a longitudinal direction between a back wall of the pit and a dock face that extends downward from the upper surface of the platform to the driveway, the lateral direction being horizontal and perpendicular to the vertical direction, the longitudinal direction being horizontal and perpendicular to both the vertical direction and the lateral direction, the loading dock further having a deck extending into the pit, the deck being selectively movable to a raised position and a lowered position relative to the platform, the loading dock further having a lip attached to the deck, the lip having a distal edge that is movable selectively to an extended position and a retracted position relative to the deck, the loading dock apparatus comprising:
    a metal casing;
    a polymeric member positioned within the metal casing;
    a metal mount to couple to the dock face at a predetermined location, the polymeric member and the metal casing being positioned within the metal mount, the metal mount being substantially stationary when attached to the dock face, the metal casing being movable relative to the metal mount by virtue of the polymeric member being resiliently compressible; and
    a lip-engaging surface on the metal mount, the lip-engaging surface being positioned to receive and engage the lip when the deck is in a lowered position and the lip is in a retracted position.

16. The loading dock apparatus of claim 15, wherein the metal casing includes a front metal plate with a RIG-engaging surface, the polymeric member being positioned between the front metal plate and the dock face when the metal mount is mounted to the dock face.

17. The loading dock apparatus of claim 16, wherein the RIG-engaging surface extends below a distal edge of the lip when the deck is in the lowered position while the lip is in the retracted position engaging the lip-engaging surface of the first RIG bumper.

18. The loading dock apparatus of claim 15, wherein metal casing, the polymeric member and the metal mount provide a first RIG bumper that is lower than the pit floor.

19. The loading dock apparatus of claim 15, wherein the deck is moveable to a lowermost position that is lower than the lowered position, and at least one of the metal casing, the polymeric member and the metal mount extends between lip and the dock face when the deck is in the lowermost position and the lip is resting against at least one of the metal casing, the polymeric member or the metal mount.

20. The loading dock apparatus of claim 15, wherein the metal casing, the polymeric member and the metal mount provides a first RIG bumper, and the loading dock apparatus further comprising:
a front metal plate on the first RIG bumper, the polymeric member being interposed between the front metal plate and the dock face; and
an inclined plate on the first RIG bumper and extending above the front metal plate.

21. A bumper for use at a loading dock, the bumper comprising:
a housing defining:
a lip-engaging surface to engage a lip of a deck when the lip is in a retracted position; and
a RIG-engaging surface positioned adjacent the lip-engaging surface, the RIG-engaging being movable relative to the lip-engaging surface, the RIG-engaging surface to move relative to the lip-engaging surface when a RIG of a vehicle imparts a force to the RIG-engaging surface and the vehicle is at a loading dock.

22. The bumper of claim 21, wherein the housing includes:
a metal casing;
a polymeric member positioned within the metal casing;
a metal mount to couple the housing to the dock face, the polymeric member and the metal casing being positioned within a perimeter of the metal mount, the metal mount being substantially stationary and the metal casing being movable relative to the metal mount when the RIG-engaging surface moves relative to the lip-engaging surface, the metal mount defining the lip-engaging surface.

23. The loading dock apparatus of claim 22, wherein the metal casing includes a front metal plate defining the RIG-engaging surface, the polymeric member being positioned between the front metal plate and the dock face when the metal mount is mounted to the dock face.

24. The loading dock apparatus of claim 23, further including an inclined plate on the first RIG bumper and extending above the front metal plate.

* * * * *